CROSSTALK REDUCTION IN PLURAL CARRIER MULTIPLEX SYSTEMS
Filed Dec. 23, 1960 2 Sheets-Sheet 1
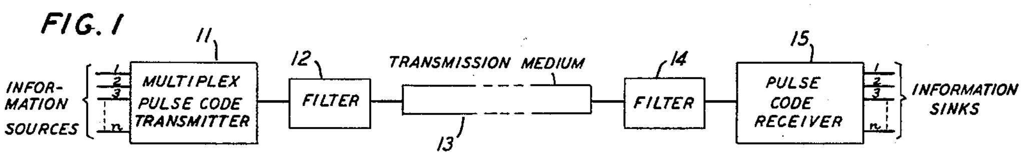
FIG. 2
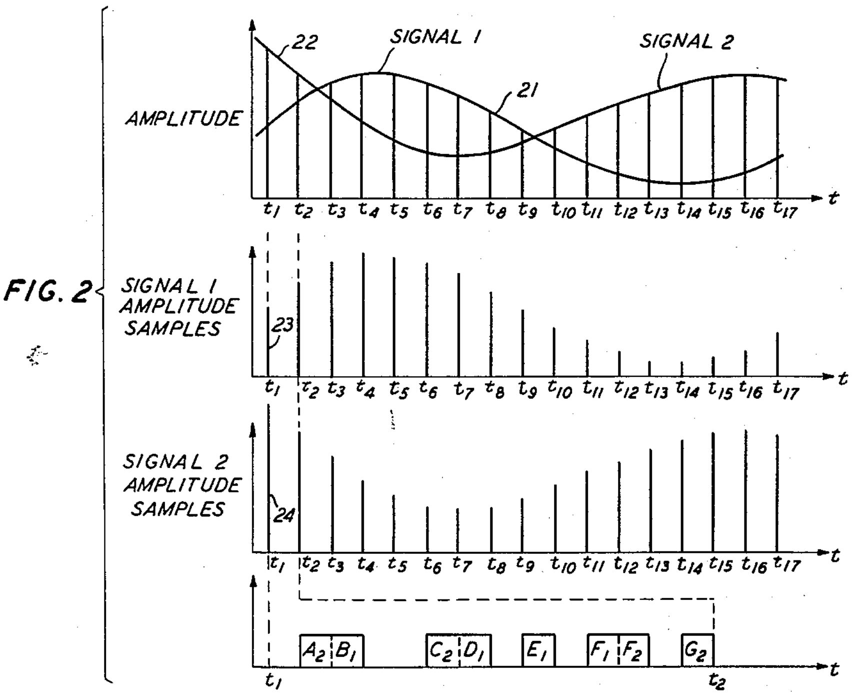
FIG. 4
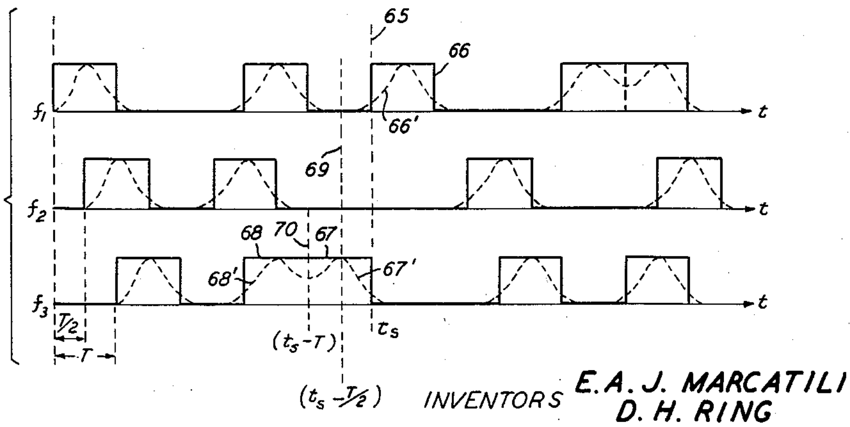
INVENTORS E. A. J. MARCATILI
D. H. RING
BY Roy M. Porter, Jr.
ATTORNEY INVENTORS E. A. J. MARCATILI
D. H. RING
BY Roy M. Porter Jr.
ATTORNEY United States Patent Office 3,084,223

Patented Apr. 2, 1963

3,084,223

CROSSTALK REDUCTION IN PLURAL CARRIER MULTIPLEX SYSTEMS

Enrique A. J. Marcatili, Fair Haven, and Douglas H. Ring, Red Bank, N.J., assignors to Bell Telephone Laboratories, Incorporated, New York, N.Y., a corporation of New York Filed Dec. 23, 1960, Ser. No. 77,919

3 Claims. (Cl. 179—15)

This invention relates to communication systems for the transmission of complex wave forms of the type encountered in speech, music, telegraph, facsimile, television signals and the like and, more particularly, to pulse multiplex transmission systems wherein a plurality of pulse trains are simultaneously transmitted on spaced carrier frequencies.

In general, pulse communication systems involve periodic sampling of the amplitude of the signal to be transmitted and conversion of such sampled amplitude into a pulse train in which the sampled amplitude is represented in a code form, typically binary. The binary code pulse train is represented by voltages or currents which are either in an "on" state or an "off" state. Thus, on-off pulse transmission has several important and inherent advantages, the most important of which arise from the fact that since the transmitted signal comprises either a voltage or no-voltage, the receiver need only be capable of distinguishing between the two signaling conditions to permit faithful transmission of the complex wave. Thus, the ability of the receiver to decide accurately whether a pulse is present or absent is a measure of the over-all system quality. The degrading effects of nonlinearity of the transmission link and other distortion as well as high signal to noise ratio and crosstalk between adjacent pulses on the same carrier wave are therefore reduced.

Transmitting signal information in the form of pulses has also enabled the use of time division principles involving interleaving pulsed information corresponding to a plurality of signals on a single carrier wave. However, the number of individual signals which may be transmitted on a single carrier has an upper limit which is often less than the number of information signals desired to be transmitted. Additionally, the transmission link, which may be a wave guide for example, often has a usable transmission bandwidth wider than that occupied by the single pulsed carrier. Accordingly, it is desirable to utilize a plurality of carriers spaced apart in frequency, each carrier being pulse modulated in a time division fashion. One major problem in such a plural carrier system involves frequency cross talk between pulses on adjacent carriers, which may be defined as the appearance of a voltage on one carrier caused by the presence of a voltage pulse on a carrier other than said one carrier. Thus, if a pulse occurs in a given time slot on carrier wave $f_1$ but no pulse is intended in the same time slot on carrier $f_2$ but the voltage from the pulse on carrier $f_1$ which is detected on carrier $f_2$ is sufficient together with noise, to present a voltage magnitude on carrier $f_2$ in the said time slot to indicate the presence of a pulse, the system error level rises and the system quality is degraded. One solution to the problem of frequency crosstalk is to increase the frequency spacing between carriers. However, to do this results in a reduction in the number of carriers available on a given transmission medium, thereby reducing its information handling capacity.

It is, therefore, an object of the present invention to reduce frequency crosstalk in multiple carrier pulse transmission systems.

It is a further object to reduce frequency crosstalk in such systems without increasing the bandwidth occupied by each carrier.

A more specific object of the present invention is to select the time slots, or pulse periods, during which pulses may occur in adjacent frequency channels to minimize the magnitude of frequency crosstalk error.

In accordance with the present invention the pulse periods on adjacent carrier frequencies are staggered by means of a time delay introduced at the transmitting station. A basic requirement of a pulse transmission system in accordance with the invention is that the pulse time slots and the sampling times on adjacent channels be synchronized to occur at specific times. If the time slots and sampling times are simultaneous on all channels, frequency crosstalk is maximized. However, by retaining synchronization but displacing the time slots of every other successive channel by one-half time slot in accordance with the invention frequency crosstalk is minimized. If no synchronization of pulse periods exists, frequency crosstalk will vary between these maximum and minimum values.

In accordance with a principal embodiment of the invention, signal wave forms from a plurality of information sources are fed into a bank of multiplex pulse code transmitters wherein each signal is sampled, each sample is transformed to a pulse carrier signal, and these signals leave the transmitters with a common timing synchronization. Each pulse train, upon leaving its respective transmitter on a unique carrier frequency is fed into time delay means, and a relative time delay of one-half pulse period is imparted to the pulse trains on every other one of the carrier frequencies. Thus alternately delayed, the plurality of pulse trains pass through combining filters onto a common transmission medium. At the receiving terminal, the signals pass through channel dropping filters to pulse code receivers in which decoding and demultiplexing occurs. The reconstructed signal wave forms then pass to the intended information sinks for utilization.

The above and other objects of the present invention, its nature and its various features and advantages will become more readily apparent from consideration of the accompanying drawing in which:

FIG. 1 is a block diagram of a typical multiplex system;

FIG. 2 is a graphical representation of the signal-to-pulse transformation operations in a typical pulse code multiplex system;

FIG. 4 is a graphical plot of typical pulse trains occurring for example in the system of FIG. 3.

Figure 3:
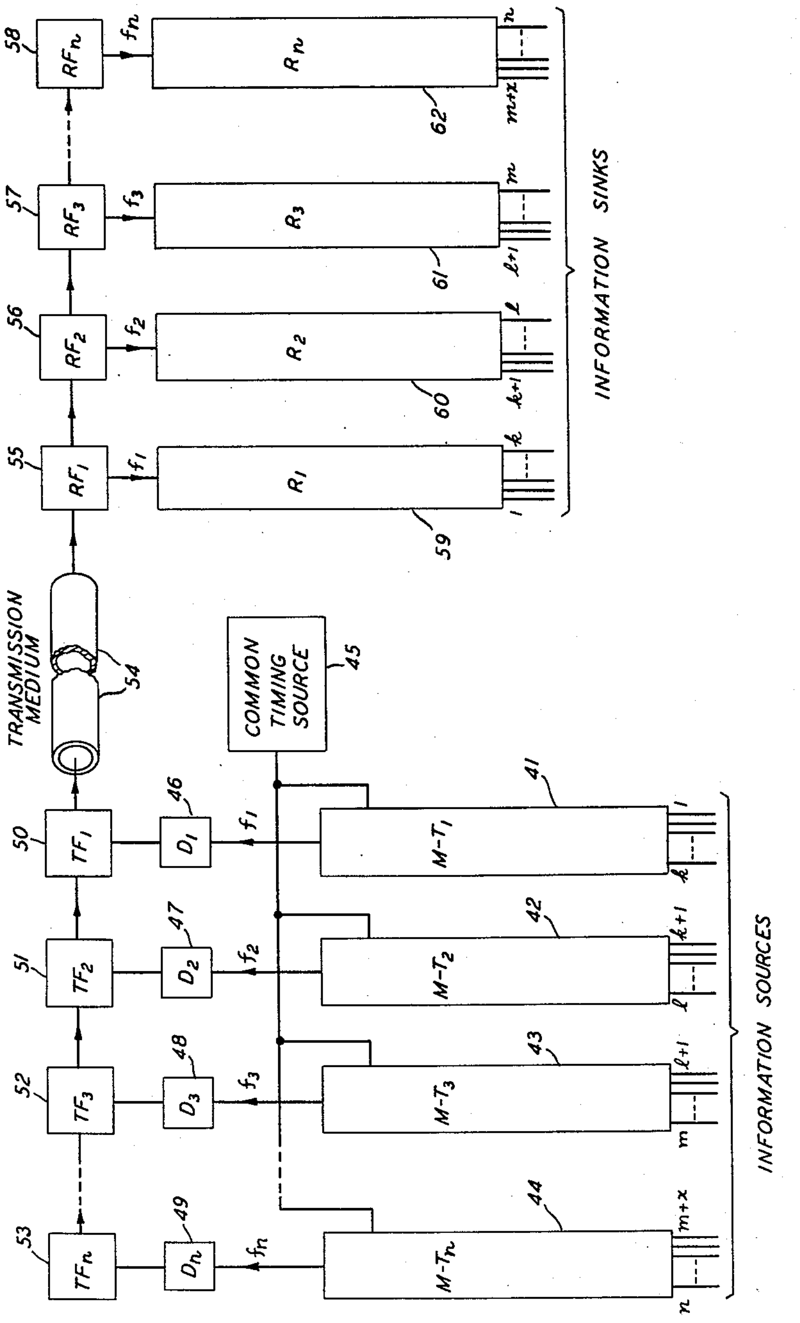
FIG. 3 is a block diagram of a multiple carrier pulse transmission system in accordance with the present invention.

Referring more specifically to FIG. 1, there is illustrated, in block form, a single carrier pulse code transmission system. Information sources *l* through *n*, representing complex wave signals to be transmitted such as voice, music, television signals, facsimile, and the like, are fed into multiplex pulse code transmitter 11. In pulse code transmission, the message waves to be transmitted are amplitude sampled at successive instants which are equally spaced in time. It has been found that for satisfactory reproduction from periodic samples of a signal of a given bandwidth, the signal must be sampled at a rate or frequency which is at least twice the highest frequency contained in the signal. Thus, the number of messages which may be multiplexed onto a single carrier wave is limited by the required sampling rate and the time necessary for transmission of the information contained in the samples. It is well known that the accuracy of transmission may be improved if the sample amplitude is coded into a series of off-on pulses for transmission rather than being transmitted as a single pulse of amplitude corresponding to the sample amplitude. A convenient code for this purpose is a 7-digit binary code in which 128 different amplitude values may be represented as different combinations of pulses termed pulse code groups. Each sampled amplitude at a given sampling point is translated into the nearest one of the 128 binary code groups, and all these pulse code groups are transmitted before the next succeeding sampling time.

FIG. 2, given for purposes of explanation, illustrates graphically the process whereby incoming signal waves are transformed into pulse code trains for transmission over a common medium. In FIG. 2 it is assumed for purposes of simplification that only two messages, represented as signal 1 and signal 2 in the first panel of FIG. 2, are to be multiplexed onto a single carrier wave. Signal 1 is designated by solid line 21 and signal 2 by solid line 22. These two signals are superimposed upon an amplitude versus time plane, and the sampled amplitudes of each signal are indicated by the vertical solid lines at regularly spaced intervals of time $t_1$ to $t_n$. At voice wave frequencies, a typical sampling rate is 8,000 time per second. In the second and third panels of FIG. 2, the sampled amplitudes are again represented as graphical plots of amplitude versus time, and it may be seen that the amplitude of signal 1 at time $t_1$ is represented by vertical solid line 23 while the amplitude of signal 2 at time $t_1$ is represented by vertical solid line 24. These amplitude samples are then translated into a binary code pulse train, a typical coding process comprising the following operations. First, pulse code groups representing each individual signal amplitude at a given sampling time $t_1$ for example, are simultaneously generated with a pulse repetition rate for voice frequency transmission equal to $8{,}000n$ where $n$ is the number of binary digits employed. Then, in order to permit transmission of information pertaining to the sampled amplitudes of both signal 1 and signal 2 before sampling time $t_2$ arrives, it is necessary to shorten the time duration of the individual pulses and to interleave the shortened pulses in time. We may assume that the seven pulse time slots corresponding to the pulse code group for amplitude 23 of signal 1 are designated 1A through 1G, and that the seven pulse time slots corresponding to the pulse code group for amplitude 24 of signal 2 are designated 2A through 2G. If an amplitude level of 46 for sample 23 and an amplitude level of 83 for sample 24 are chosen, the binary pulse code groups may be represented as follows, a zero indicating the absence of a pulse, a one indicating the presence of a pulse.

| | A | B | C | D | E | F | G |
|---|---|---|---|---|---|---|---|
| Signal 1 | 0 | 1 | 0 | 1 | 1 | 1 | 0 |
| Signal 2 | 1 | 0 | 1 | 0 | 0 | 1 | 1 |

In the information transmission process, the digits are interleaved, the A digit of all signal amplitude pulse code groups being sequentially transmitted fist, then the B digits of all code groups, etc., until all the G digits are transmitted. This entire operation must be completed during the time interval between sampling times or, in the present example, during the 1/8000 second between times $t_1$ and $t_2$.

The lower panel of FIG. 2 represents the pulse train corresponding to samples 23 and 24 after interleaving in accordance with the above description. Each pulse is designated by its particular digit position and its particular signal number. It should be noted that the time scale in the lower panel of FIG. 2 has been expanded for purposes of clarity of illustration. The number of waves which may be multiplexed together on a single carrier is thus limited, since pulse code groups corresponding to one amplitude sample for each signal to be multiplexed must occur prior to the next successive sampling time, and the number of pulses which may be transmitted in a given time interval is itself limited.

Returning now to FIG. 1, a pulse train having the characteristics of the one in the lower panel of FIG. 2 modulates a carrier frequency and the pulse modulated carrier passes through filter 12 onto transmission medium 13, which may be for example a coaxial line, a radio link, or a wave guide. Upon arrival at the receiving terminal, the pulse modulated signal passes through filter 14 into pulse code receiver 15, in which the pulse code groups are decoded and the resultant amplitude signals are used to reconstruct the original message waves. These reconstructed message wave signals are then connected to their intended information sinks.

In the relatively simple pulse transmission system of FIG. 1, the noise level of the transmission and reception system and of the transmission medium is an important criterion in determining the over-all system quality. In addition, since the idealized rectangular pulses are distorted in transmission and tend to extend into adjacent time slots, thereby resulting in time crosstalk, care must be exercised in designing the system components. United States Patent 2,681,384 issued June 15, 1954, to G. Guanella is an example of prior endeavors to minimize time crosstalk. When, however, the bandwidth capabilities of the transmission medium exceed that of a single carrier band, and it becomes desirable to utilize a plurality of pulse modulated carriers in order to increase the number of messages which may be simultaneously transmitted, errors caused by frequency crosstalk between the pulses on adjacent carrier waves arise. Thus, the superimposed combination of the amplitude levels of time crosstalk, noise, and frequency crosstalk may cause the pulse code receiver to detect a pulse in a time slot in which none was transmitted.

FIG. 3 illustrates, in block diagram form, a plural channel pulse transmission system in which the frequency crosstalk level may be minimized in accordance with the present invention. Information sources $l$ through $n$ provide the inputs to multiplex pulse code transmitters 41, 42, 43, and 44. The number of separate pulse transmitters is illustrated as four but this number is not intended to be limiting, as indicated by the designations $M—T_n$ where $n$ may be any integer consistent only with the bandwidth capacity of the common transmission medium employed. Each of the pulse code transmitters 41—44 operates upon their respective incoming wave messages $l$ through $k$, $(k+1)$ through $l$, $(l+1)$ through $m$, and $(m+x)$ through $n$ in the manner described above with respect to FIGS. 1 and 2, and translates these signals into an on-off pulse train modulated carrier wave.

The pulse periods for the pulses from each transmitter are synchronized to occur in identical time slots by common timing source 45. That is, if the groups of information sources constituting the input to each transmitter were identical, the pulse code output from each transmitter would not only be identical, but the pulse trains would be identically congruent in time. From the point of view of frequency crosstalk, such a synchronization is maximizing in effect, but the introduction of such synchronization also affords the ability to control the relative time delays among the various carrier channels. Accordingly, and in accordance with the present invention, a relative time delay is introduced among the pulse trains on the various carriers. One convenient way in which to introduce the desired delay is to pass the outputs from pulse code transmitters 41—44 through time delay means 46—49, respectively. The function of delay means 46—49 is to stagger the pulse time slots on adjacent frequency channels in order to decrease the frequency crosstalk level of the signal detected at the receiver. The particular position of the time delay means pictured in FIG. 3 is illustrative only and is not intended to be limiting.

After passing through the time delay means, each respective pulse modulated carrier passes into and through filters 50—53, whose function is to combine the respective carriers for transmission over a common transmission medium. One such medium suitable for wide band signal transmission is hollow pipe type wave guide and, in FIG.

3, the common medium is indicated as round wave guide 54. During the past few years, the utility of hollow pipe wave guide as a long distance communication medium has begun to be exploited as the particular properties of the $TE_{01}$ circular electric mode family have become better known and more readily adaptable to wave guide transmission principles. At frequencies of the order of 30 to 90 kilomegacycles, wave guide transmission in the $TE_{01}$ mode over long distances becomes theoretically feasible. At such frequencies, many multiplexed pulse coded carrier waves may be transmitted simultaneously over a single common medium.

Upon reaching the utilization station, the multicarrier information wave passes from common medium 54 into a bank of filters 55—58 and each pulse modulated carrier is dropped into a separate pulse code receiver. It may be desirable, prior to the channel dropping operation, to split the incoming wide band signal into two or more subbands in order to reduce resonances and multiple reflections caused by a long line of sequential filters. The dropped modulated carriers arrive at receivers 59—62, and are decoded and demultiplexed therein. After decoding and demultiplexing, the signal information passes to the intended information sinks.

It is in the pulse code receivers that the utility of the time delays introduced at the transmitter in accordance with the present invention is most evident. Ordinarily, when the transmitted pulses are synchronized in time, the sampling times at the receiver are likewise synchronized to occur at the center of the pulse period. If no relative delay is introduced among the various carrier channels, it will be easily appreciated that the sampling time on a given channel occurs at the time for which a pulse which may be present on one of the two adjacent frequency channels is at or near maximum amplitude, thereby increasing the probability that the detected signal on the given channel will be increased due to frequency crosstalk. When pulses simultaneously appear in the same time slot on adjacent channels no serious detection error will be introduced since a pulse is intended to be present on each channel. However, if no pulse is intended to appear on the given channel but pulses do appear on both the next higher and next lower carriers, the frequency crosstalk level may be sufficient to cause an erroneous detection of the presence of a pulse on the given channel. By reference to FIG. 4, the manner in which the present invention reduces the probability of pulse detection errors at the receiver may be more easily understood.

In FIG. 4 a series of three pulse trains is illustrated, the upper train being modulated on carrier $f_1$, the middle train on carrier $f_2$ (assumed to be the carrier next adjacent carrier $f_1$), and the lower train on carrier $f_3$ (assumed to be the carrier next adjacent carrier $f_2$). For purposes of explanation these pulse trains may be considered to be the outputs of multiplex transmitters 41, 42, and 43, respectively, of FIG. 3.

In FIG. 4, the time interval per time slot is indicated to be T. Each idealized pulse which occurs is of such duration, regardless of the carrier on which it appears. However, the relative time of occurrence of the time slots themselves on carrier $f_2$ is delayed by an amount $T/2$ with respect to carriers $f_1$ and $f_3$. The significance of such delay may be appreciated by a brief consideration of one specific sampling time in the illustrated pulse trains. It should be noted that the introduction of a time delay into the pulse trains at the transmitter requires a like introduction of delay in the sampling times at the receiver in order that sampling occur midway in the time slots, at which point the pulse amplitude, if a pulse is present, is ideally maximum. For purposes of illustration, the situation at sampling time $t_s$ will be examined, this time being indicated on the drawing as dashed vertical line 65. It may be seen that no pulse appears on carrier $f_2$ during the time slot extending from $$\left(t_s-\frac{T}{2}\right) \text{ to } \left(t_s+\frac{T}{2}\right)$$

and, accordingly, the detected voltage level at $t_s$ should be ideally zero. In practice, the detected voltage level should be less than the system slicing level, which is that voltage which is taken to indicate the presence of a pulse. At the instant $t_s$, pulse 66 is beginning on carrier $f_1$ and pulse 67 is ending on carrier $f_2$. Although pulses 66, 67 are illustrated with the idealized rectangular shape, it is well known that in actual pulse transmission systems the leading and trailing pulse edges are curved. Thus, inside each of the rectangular pulses in FIG. 4, a pulse is indicated in dashed outline which more nearly represents the actual wave form of the received signals. Thus, pulse 66' appears within idealized pulse 66 and pulse 67' within idealized pulse 67.

At sampling time $t_s$ the amplitude of pulse 66' is seen to have a low value. Thus, no significant amount of frequency crosstalk between channels $f_2$ and $f_1$ will arise upon sampling $f_2$ at $t_s$. Likewise, the amplitude of pulse 67' is seen to have decreased substantially toward zero at time $t_s$ and therefore a low level of frequency crosstalk would be expected. On the other hand, if the half time slot delay had not been introduced, sampling of carrier $f_2$ would have occurred at what is indicated by dashed vertical line 69 as $(t_s-T/2)$ on carriers $f_1$ and $f_3$. It may easily be seen that at time $$\left(t_s-\frac{T}{2}\right)$$

the amplitude of pulse 67' is at its maximum. Thus, the amount of frequency crosstalk introduced would have been significant. The invention is beneficial in reducing crosstalk even when a double pulse occurs on a frequency channel adjacent that being sampled. Thus, at sampling time $(t_s-T)$ on channel $f_2$, indicated by dashed vertical line 70, the center of a double pulse appears on channel $f_3$. However, the dotted amplitude characteristic 68'—67' indicates the amplitude minimum and therefore the crosstalk minimum to adjacent channels occurs at time $t_s-T$, the sampling time on channel $f_2$. Further inspection of the pulse trains of FIG. 4 will indicate that each sampling point is optimum in time to reduce frequency crosstalk from possible pulses in adjacent frequency channels.

It may well be the case that due to inherent system delays in the multiplex transmitters, the pulses themselves will be distorted to have an asymmetric shape with respect to the time slot center. In such a case the sampling time at the receiver may more advantageously occur at other than the exact center of the time slot. In addition, it may be desirable to introduce some delay to all channels in order to retain equivalent over-all transfer functions for all channels. In such a case, each of delay networks 46—49 of FIG. 3 would operate to introduce some finite delay, the amounts in alternate frequency channels differing by substantially one-half time slot.

Various other schematic arrangements of multichannel pulse transmission systems in accordance with the present invention may be devised. Thus, for example, the time delay may be introduced as an operation in the combining filters or in the transmitters themselves. The essential characteristics are that a relative delay of substantially one-half time slot appear on alternate frequency channels at the transmitting station and that the time slot occurrence be synchronized at some point prior to the introduction of the relative delay. In all cases it is to be understood that the above-described arrangements are merely illustrative of the many specific embodiments which can represent applications of the principles of the invention. Numerous and varied other arrangements can readily be devised in accordance with these principles by those skilled in the art without departing from the spirit and scope of the invention.

What is claimed is:

1. In a transmission system, a source of a plurality of frequency spaced carrier waves, means for modulating said carriers with pulse trains having synchronous time slots, a common transmission medium for said carrier waves, and means for transmitting said modulated carrier waves over said common medium with alternate ones of said carriers being delayed at the transmitter one-half time slot with respect to the remainder of said carriers.

2. A plural carrier multiplex transmission system employing pulse modulation comprising a first terminal, a second terminal, a wideband transmission medium interconnecting said first and said second terminals, a plurality of signal wave sources connected to said first terminal, a plurality of frequency spaced carrier frequency sources at said first terminal, means at said first terminal for representing instantaneous amplitude samples of said signal waves by a plurality of pulse trains having synchronized pulse period repetition rates, means also at said first terminal for modulating carrier frequency channels $f_1$, $f_2$ . . . $f_n$ each with a different one of said pulse trains for transmission over said medium to said second terminal, and further means at said first terminal for delaying the time of occurrence of pulses on carrier channels $f_2$, $f_4$ . . . $f_{n-1}$ one-half pulse period with respect to the time of occurrence of pulses on carrier channels $f_1$, $f_3$ . . . $f_n$.

3. A transmission terminal for the transmission of complex wave forms of the type encountered in speech, music, telegraph, facsimile, and television comprising, a plurality of sources of such wave forms each having an input to said terminal, a plurality of frequency spaced carrier frequency sources, means at said terminal for translating the information contained in said input signal wave forms into a plurality of pulse trains having time synchronized pulse periods, means at said terminal for pulse modulating each of said carrier waves with a different one of said pulse trains, and further means at said terminal for imparting a relative time delay to alternate ones of the pulse modulated carrier waves, the duration of said delay being one-half pulse period.

References Cited in the file of this patent

UNITED STATES PATENTS

| | | |
|---|---|---|
| 2,559,644 | Landon | July 10, 1951 |
| 2,607,035 | Levine | Aug. 12, 1952 |